Sept. 9, 1952 H. C. SHAGALOFF 2,610,032
AIR CONDITIONING
Filed Feb. 11, 1949 3 Sheets-Sheet 1

INVENTOR.
Harry C. Shagaloff
BY
Oliver S. Titcomb
his ATTORNEY

Sept. 9, 1952  H. C. SHAGALOFF  2,610,032
AIR CONDITIONING
Filed Feb. 11, 1949  3 Sheets-Sheet 3

INVENTOR
Harry C. Shagaloff
BY
Oliver S. Titcomb
his ATTORNEY

Patented Sept. 9, 1952

2,610,032

UNITED STATES PATENT OFFICE 2,610,032

AIR CONDITIONING

Harry C. Shagaloff, Evansville, Ind., assignor to Servel, Inc., New York, N. Y., a corporation of Delaware.

Application February 11, 1949, Serial No. 75,826

14 Claims. (Cl. 257—3)

The present invention relates to air conditioning apparatus for cooling or heating air in an enclosure and more particularly to an automatic control for adjusting the apparatus to dehumidify the air by cooling and then reheat the dehumidified air to its original temperature.

The present invention constitutes an improvement in air conditioning apparatus and controls of the type illustrated and described in co-pending applications for United States Letters Patent of Sven W. E. Andersson, Serial No. 645,552, filed February 5, 1946, entitled Air Conditioning, now Patent 2,486,908, issued Nov. 1, 1949, and Lowell McNeely, Serial No. 44,381, filed August 14, 1948, entitled Air Conditioning, now Patent No. 2,581,122, issued Jan. 1, 1952. The air conditioning apparatus illustrated in said prior applications is operated by heat to supply either a heating medium or a cooling medium to a heat exchange means. A manually actuated selective control adjusts the apparatus for either a heating or cooling operation and a thermostat responsive to a temperature affected by the heat exchange means regulates the operation of the apparatus.

An auxiliary humidity responsive control also is provided for automatically adjusting and regulating operation of the apparatus to simultaneously supply a cooling medium and heating medium to the heat exchange means to dehumidify the air by cooling and reheat the dehumidified air. The humidity responsive control is operative only when the humidity is high and the thermostat is satisfied or, in other words, below the temperature at which the thermostat initiates operation of the apparatus to supply a cooling medium to the heat exchange means. While the control arrangements illustrated in said prior applications operate satisfactorily, it is possible to cool the air below comfort conditions during dehumidification and the control means must be manually actuated to adjust the apparatus for either heating or cooling.

One of the objects of the present invention is to provide a control for automatically adjusting and regulating operation of an air conditioning apparatus of the type indicated to dehumidify the air by cooling and reheat the dehumidified air without either heating or cooling the air above or below predetermined temperature limits.

Another object is to provide a control of the type indicated having a differential thermostat operable at an upper temperature limit for automatically adjusting and regulating operation of the apparatus to supply a cooling medium to the heat exchange means and operable at a lower temperature limit for automatically adjusting and regulating the apparatus to supply a heating medium to the heat exchange means.

Another object is to provide a control which is operable between the upper and lower temperature limits for adjusting and regulating operation of the apparatus to supply a cooling medium and heating medium to the heat exchange means simultaneously to dehumidify the air by cooling and heat the dehumidified air.

Another object is to provide a control means of the type indicated which regulates the operation of apparatus to discontinue cooling at the lower temperature limit and discontinue heating at the upper temperature limit.

Still another object of the invention is to provide an electric control means having temperature responsive circuits energized by a differential thermostat at upper and lower temperature limits to initiate operation of a refrigeration system and heating system, respectively, a humidity responsive circuit energized by a humidistat for initiating operation of the refrigeration and heating systems simultaneously, and means for deenergizing the humidity responsive circuit upon energization of either of the temperature responsive circuits.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawings:

*Air conditioning apparatus*

Figure 1:
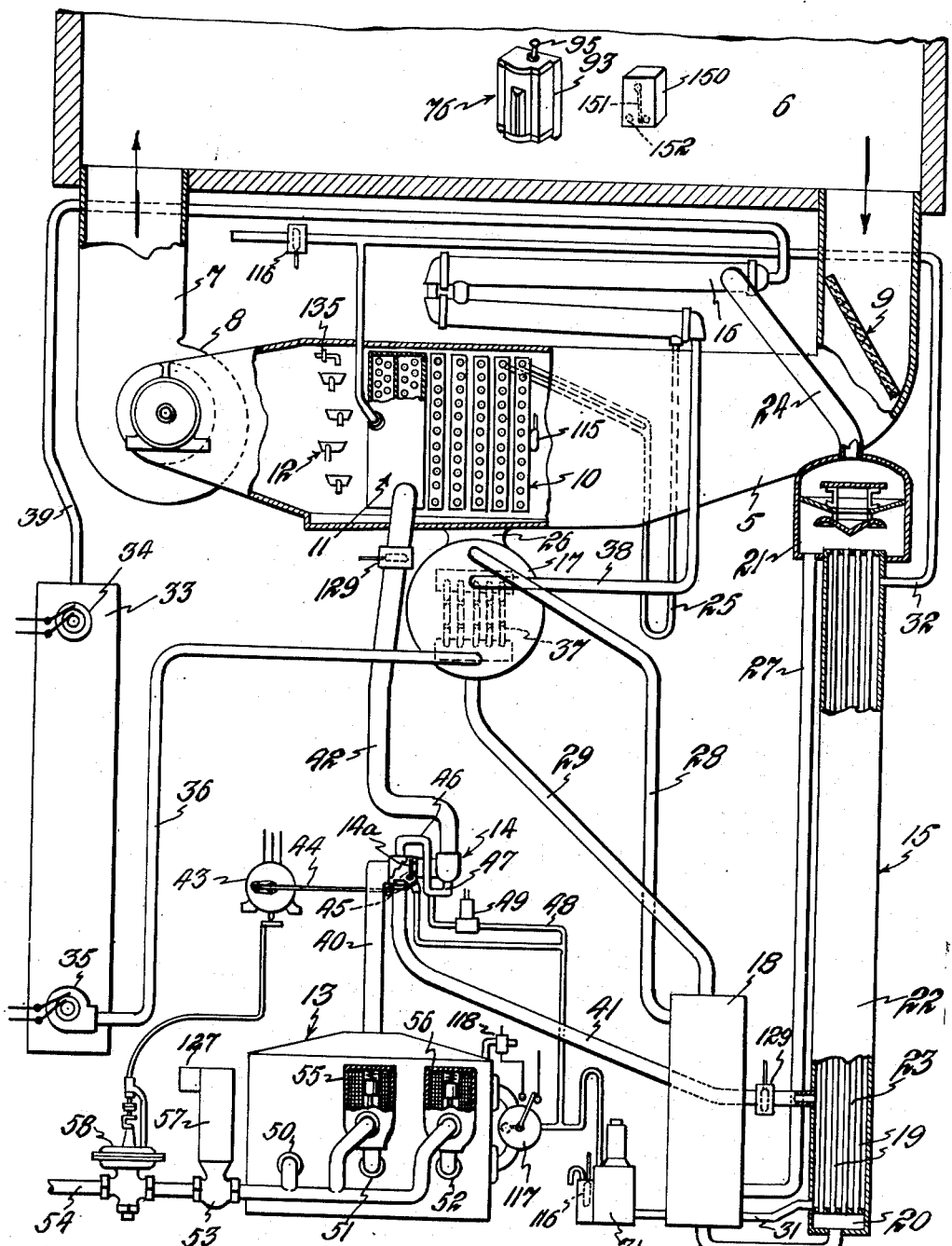
Fig. 1 is a diagrammatic view of an air conditioning unit to which the control means of the present invention is applied.

The air conditioning apparatus to which the present invention is shown applied is generally similar to that illustrated and described in the co-pending Andersson and McNeely patents, referred to above. Suffice it to state herein that the air conditioning apparatus comprises a duct 5 for receiving air from the enclosure 6 to be conditioned and a duct 7 for delivering conditioned air to the enclosure. The air to be conditioned is circulated through the ducts 5 and 7 in the direction indicated by arrows by means of an electric motor operated fan 8. As the air flows through the duct 5 it is conditioned by elements therein comprising a filter 9, a cooling element 10, a heating element 11 and a humidifier 12. The cooling element 10 constitutes the evaporator of a heat operated absorption refrigeration system while the heating element 11 constitutes the radiator of a heating system. Both the refrigeration system and heating system are selectively supplied with a suitable heating medium, such as steam, from any suitable source such as a boiler 13 as illustrated in Fig. 1. The steam from the boiler 13 is directed to either the refrigeration system or the heating system by conduit means including a selective valve 14, later to be described in detail.

The heat operated refrigeration system preferably is of the type which operates in a partial vacuum and utilizes water as a refrigerant and a salt solution as an absorbent. The refrigeration system comprises a generator 15, a condenser 16, the evaporator 10, an absorber 17, and a heat exchanger 18 interconnected to provide closed circuits for refrigerant and absorbent. The generator 15 comprises a series of upright tubes 19 connected at their lower ends to an inlet chamber 20 and at their upper ends to a separating chamber 21. Surrounding the tubes 19 is a jacket 22 providing a heating chamber 23 therebetween. A conduit 24 connects the separating chamber 21 to one end of the condenser 16 for delivering refrigerant vapor thereto and the opposite end of the condenser is connected to the top of the evaporator 10 by a U-tube 25 through which liquefied refrigerant flows. The U-tube 25 provides a liquid trap for maintaining the difference in pressure between the condenser 16 and evaporator 10 which is balanced by a liquid column in the left-hand leg of the U-tube as viewed in Fig. 1. Headers 26 connect opposite ends of the evaporator 10 to the top of the absorber 17 and refrigerant vapor flows through the headers from the evaporator to the absorber.

Absorption solution from which refrigerant vapor has been expelled flows by gravity from the separating chamber 21 to the top of the absorber 17 in a path of flow including conduit 27, heat exchanger 18, and conduit 28. Absorption solution strong in refrigerant flows by gravity from the bottom of the absorber 17 to the chamber 20 at the base of the generator 15 in a path of flow including conduit 29, heat exchanger 18, and conduit 30. Condensate is drained from the heating chamber 23 of the generator 15 by a conduit 31 including a condensate return pump 31a and a vent tube 32 is connected to the jacket 22 of the generator 15 and to the heating element or radiator 11 at a point remote from the steam inlet.

The absorber 17 and condenser 16 are cooled by cooling water from any suitable source, such as a cooling tower 33, illustrated in Fig. 1 of the drawings. An electric motor driven fan 34 at the top of the cooling tower 33 produces a flow of air upwardly therethrough and an electric motor driven pump 35 at the bottom of the tower circulates cooled water through the absorber 17 and condenser 16 of the refrigeration system. The path of flow of the cooling water comprises a conduit 36, cooling coils 37 in the absorber 17, conduit 38, condenser 16, and conduit 39 back to the top of the cooling tower.

When heat is supplied to the heating chamber 23 of the generator 15, refrigerant vapor is expelled from absorbent and delivered to the condenser 16 where it is liquefied. The liquefied refrigerant is supplied to the evaporator 10 through the U-tube 25 which provides a liquid trap and together with the liquid traps in conduits 28 and 29 between the absorber 17 and generator 15 maintain the difference in pressure in the system. Absorption of refrigerant vapor by the absorbent in the absorber so reduces the pressure in the evaporator 10 as to cause evaporation of refrigerant therein at low temperature to produce a refrigerating or cooling effect.

The heating system comprises the radiator 11 and the conduit means including the diverter valve 14 connecting the radiator to the boiler 13.

The conduit means for directing steam to either the refrigeration system or heating system comprises a steam main 40 connected between the boiler 13 and an inlet port to the selector valve 14. A conduit 41 leads from the selector valve 14 to the heating chamber 23 of the generator 15 and a conduit 42 leads from the selector valve to the heating element or radiator 11. The selector valve 14 has a valve element 14a movable to one or the other of two positions to close one conduit 41 or 42 and open the other conduit as illustrated and described in detail in the McNeely application referred to above. The valve element 14a is actuated from one to the other of its two positions by an electric motor 43, link 44 and crank arm 45 connected to the movable valve element. The motor 43 is operable through 180° of movement as controlled by limit switches 107 and 133, see Fig. 2, as later described in detail. Thus, when the valve element 14a is actuated by the motor 43 to close the conduit 42, it provides a path of flow for steam from the boiler 13 through the main 40 and conduit 41 to the heating chamber 23 of the generator 15. When the valve element 14a is moved to the other of its two positions to close the conduit 41, it provides a path of flow for steam from the boiler 13 through the main 40 and conduit 42 to the heating element or radiator 11.

A by-pass conduit 46 also is provided for directing steam around the selector valve element 14a when the latter is in the position illustrated to close conduit 42. The by-pass conduit 46 has a depending loop providing a liquid trap 47 arranged below conduit 42 to receive condensate draining from the radiator 11. Condensate draining from the radiator 11 accumulates in the liquid trap 47 to close the by-pass conduit 46. A drain conduit 48 is connected to the bottom of the liquid trap 47 and a valve 49 in the conduit controls the flow of condensate therefrom. Drain conduit 48 is connected to the condensate return line 31 which, in turn, is connected to the side of the boiler 13.

The boiler 13 may be heated by any suitable type of fluid fuel burners such as the plurality of gas burners 50, 51 and 52. The flow of fuel to the burners 50, 51 and 52 is preferably controlled by a master valve 53 in the fuel supply line 54 and individual valves 55 and 56 for the burners 51 and 52. Master valve 53 is opened by an electric motor 57 and valves 55 and 56 are opened by electromagnetic actuating coils. As more heat may be required by the heating system to heat the air than is required by the refrigeration system to cool the air, an adjustable gas pressure regulator 58 may be provided in the fuel supply line 54. As thus far described, the air conditioning apparatus is substantially identical with that illustrated in the McNeely application referred to above.

Cooling and heating controls

In accordance with the present invention an electric control arrangement is provided which is automatically operable at an upper temperature limit for adjusting and initiating operation of the apparatus to supply cooling medium to the heat exchange means; automatically operable at a lower temperature limit for adjusting and initiating operation of the apparatus to supply a heating medium to the heat exchange means; automatically operable between the upper and lower temperature limits when the humidity is high for adjusting and initiating operation of the apparatus to supply both a cooling medium and heating medium to the heat exchange means to dehumidify the air by cooling and reheat the dehumidified air; and automatically operable at the lower temperature limit to stop cooling and at the upper temperature limit to stop reheat.

Figure 2:
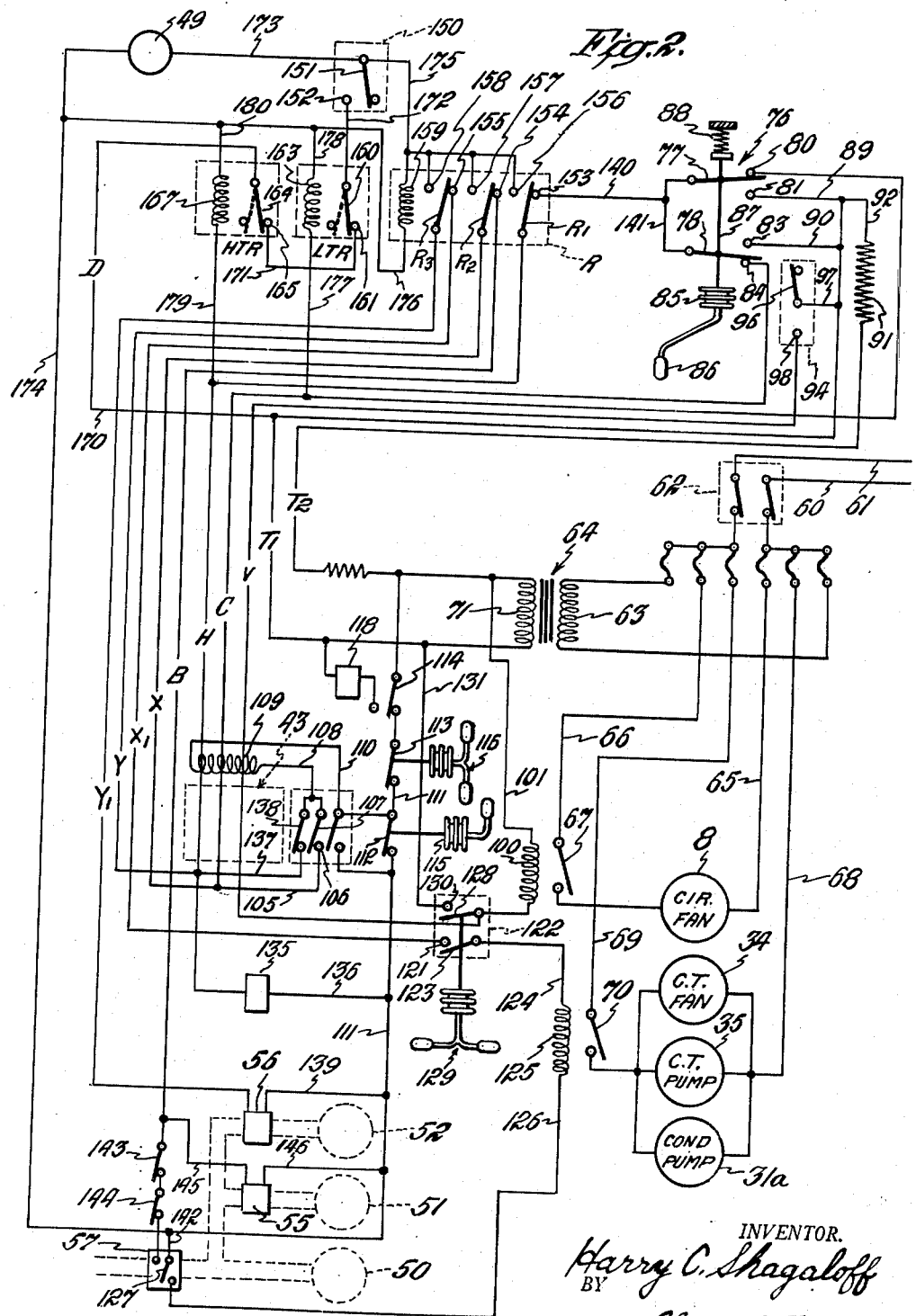
Fig. 2 is a wiring diagram of an electric control system for the air conditioning unit illustrated in Fig. 1 and incorporating the improved dehumidifying and reheat control of the present invention.

The electric control circuits are illustrated in Fig. 2 of the drawings and comprise supply mains 60 and 61 from a source of electric current. Supply mains 60 and 61 are connected through a line switch 62 to the primary winding 63 of a step-down transformer 64. In parallel with the primary winding 63 of the transformer 64 is a circuit for energizing the motor for the circulating fan 8 comprising a conductor 65 connecting the main 60 to one side of the fan motor and a conductor 66 connecting the other side of the fan motor to the main 61. A relay switch 67 in conductor 66 controls the starting and stopping of fan 8.

The motors for the cooling tower fan 34, cooling tower pump 35 and condensate return pump 31a are connected in parallel with one side connected to the main 60 by a conductor 68 and the opposite side connected to the main 61 by a conductor 69. A relay switch 70 in conductor 69 controls the simultaneous starting and stopping of the cooling tower fan 34 and pump 35 and condensate return pump 31a.

The secondary 71 of the step-down transformer 64 is connected by conductors $T_1$ and $T_2$ to various control circuits for the air conditioning apparatus. These various control circuits comprise a ventilating circuit V for initiating operation of the circulating fan 8 when energized, a cooling circuit C for adjusting the apparatus for a cooling operation when energized, a heating circuit H for adjusting the apparatus for a heating operation when energized and a burner circuit B energized simultaneously with either the cooling circuit C or heating circuit H for initiating operation of the boiler 13 when energized.

The circuits C, H and B are controlled by a differential thermostat 76 of the type illustrated and described in United States Letters Patent of S. W. E. Andersson No. 2,381,427, issued August 7, 1945, and entitled Air Conditioning. For simplicity of illustration and description the differential thermostat 76 is shown as comprising a pair of single-pole double-throw switches having movable contacts 77 and 78, respectively. Switch contact 77 is engageable with one or the other of fixed contacts 80 and 81, and switch contact 78 is engageable with one or the other of fixed contacts 83 and 84. The movable contacts 77 and 78 are arranged to be actuated sequentially in either direction by a temperature responsive means consisting of an expansible bellows 85 and a bulb 86 connected thereto and containing a volatile liquid. The switch contacts 77 and 78 are shown connected for actuation by a member 87 which, in turn, is actuated by the bellows 85 to first move contact 77 into engagement with the fixed contact 80 upon a rise in temperature and thereafter move contact 78 into engagement with the fixed contact 83 upon a further rise in temperature. Acting on the actuating member 87 in opposition to the bellows 85 is a spring 88 which first moves contact 78 into engagement with the fixed contact 84 upon a decrease in temperature and thereafter moves contact 77 into engagement with the fixed contact 81 upon a further decrease in temperature. The arrangement is such that the movable contacts 77 and 78 are moved sequentially into engagement with the fixed contacts 80 and 83 or 84 and 81 upon a fixed difference in temperature. For example, from the position illustrated in Fig. 2 it may require a degree increase in temperature to move the movable contact 78 into engagement with the fixed contact 83 constituting an upper temperature limit and a degree difference in temperature to actuate the movable contact 77 into engagement with the fixed contact 81 constituting the lower temperature limit. Thus there is a two degree difference in temperature between the upper and lower temperature limits, but the thermostat may be set to give any desired temperature differential.

Conductor $T_1$ from one side of the secondary 71 of the step-down transformer 64 is connected to the fixed contacts 81 and 83 of the differential thermostat 76 by means of conductors 89 and 90. Conductor $T_1$ is also connected to one side of an electric resistance element 91 by means of a conductor 92 and the opposite side of the resistance is connected to the opposite side of the transformer secondary 71 by a conductor $T_2$. The thermostat 76 is enclosed in a casing 93 in the enclosure 6 to be conditioned, see Fig. 1, except for the bulb 86 which is located outside the casing and the electric resistance element 91 is located in the casing to heat the interior thereof whereby the exposed bulb is the coldest part of the thermal responsive actuating means.

The ventilating circuit V is energized independently of the thermostat 76 by a manually operated single-pole switch 94 also enclosed in the casing 93 and having an operating handle 95 projecting from the top of the casing, see Fig. 1. The pole or movable contact 96 of the ventilating switch 94 is connected to the $T_1$ by a conductor 97, see Fig. 2. The V wire of the ventilating circuit has one end connected to the fixed contact 98 of the switch 94 and the opposite end of the V wire is connected to one side of an actuating coil 100 for the relay switch 67 in the control circuit for the circulating fan 8. The opposite side of the actuating coil 100 is connected to $T_2$ adjacent the secondary winding 71 of the step-down transformer 64 by a conductor 101.

The cooling circuit C comprises a conductor, indicated by the same reference character, connected at one end to the fixed contact 80 of the differential thermostat 76 and to a branch conductor 105 at its other end. Branch conductor 105 is connected to the fixed contact 106 of a limit switch 107 arranged to be actuated to open position by the motor 43 at the end of its movement to adjust the selective valve 14 for a cooling operation as illustrated in Fig. 1. The other side of the limit switch 107 is connected by a conductor 108 to one end of the winding 109 for the motor 43. The opposite end of motor winding 109 is connected by a conductor 110 to a return conductor 111 and the return conductor is connected to $T_2$ adjacent the secondary winding 71 for the step-down transformer 64. Return conductor 111 includes safety switches consisting of a low temperature cut-out switch 112, a vent switch 113 and a low water cut-out switch 114. Suffice it to state that the low temperature cut-out switch 112 is actuated by a thermal element 115 responsive to the temperature of the refrigerant in the evaporator or cooling element 10; the vent switch 113 is actuated by a thermal element 116 responsive to the temperature of steam escaping from the generator heating chamber 23 or radiator 11 through vent pipe 32 or by overflow of condensate if the condensate pump 31$a$ fails to operate; and the low water cut-out switch 114 is responsive to a liquid level control element 117 in the boiler 13, see Fig. 1, for simultaneously opening the cooling circuit C and closing a circuit through a water supply valve 118.

Another branch conductor X from the conductor C is connected through a relay switch $R_2$ of a reheat relay R, later to be described in detail, and from $R_2$ through conductor $X_1$ to the fixed contact 121 of a delayed action control switch 122. Pole 123 of switch 122 is connected by a conductor 124 to one end of an actuating coil 125 for the relay switch 70 for controlling operation of cooling tower 33 and condensate pump 31$a$. The opposite end of the actuating coil 125 is connected by a conductor 126 to a switch 127 actuated by the motor 57 for opening and closing the master fuel valve 53. Switch 127 is so arranged as to be closed when the fuel valve 53 is open and opened when the fuel valve is closed. The opposite side of the switch 127 is connected by a conductor 142 to the return conductor 111 which, in turn, is connected to $T_2$ to complete the circuit.

Delayed action control switch 122 comprises the pole 123 and a second pole 128 connected for joint operation by a thermal element 129 responsive to the temperature of steam supplied to the heating chamber 23 of the generator 15 or to the heating radiator 11. Pole 128 of the delayed action control switch 122 is connected to the V wire and one end of the relay actuating coil 100 and a fixed contact 130 engaged by the pole 128 is connected by a conductor 131 to $T_1$. Thus, the actuation of the circulating fan 9 and the cooling tower fan 34, cooling tower pump 35 and condensate return pump 31$a$ is delayed until steam is supplied to the generator 15 or heating radiator 11, respectively.

The heating circuit H comprises a conductor, indicated by the same reference character, having one end connected to the fixed contact 94 of the differential thermostat 76 and its opposite end is connected to a magnetically operated valve 135 for supplying water to the humidifier 12. The opposite side of the magnetically operated valve 135 is connected to the return conductor 111 through a conductor 136. A branch conductor 137 connects the conductor H to a limit switch 138 actuated by the diverter valve motor 43 alternately with the limit switch 107 after each 180° of movement. The circuit from the limit switch 138 is completed through the conductor 108, motor winding 109, the conductor 110 and return conductor 111 to $T_2$. A second branch conductor Y from conductor H is connected to relay switch $R_3$ of the reheat relay R and from the relay switch through conductor $Y_1$ to the magnetically operated fuel valve 56. A circuit is completed from the magnetically operated valve 56 by a conductor 139, return conductor 111 and $T_2$.

The burner circuit B is arranged for energization simultaneously with the energization of either the cooling circuit C or heating circuit H. The burner circuit B comprises a conductor, indicated by the same reference character, connected at one end to the switch $R_1$ of reheat relay R which, in turn, is connected by conductors 140 and 141 to the movable contacts 77 and 78 of the differential thermostat 76. The opposite end of conductor B is connected to the motor 57 for actuating the master fuel valve 53 which is completed through the motor winding, conductor 142 and return conductor 111 to $T_2$. Conductor B also includes safety switches 143 and 144 actuated by thermocouples adjacent pilot burners (not shown). A branch conductor 145 connects conductor B to the magnetic coil of the fuel valve 55 and the opposite side of the magnetic coil is connected by a conductor 146 to return conductors 111 to $T_2$.

*Reheat control*

Figure 3:
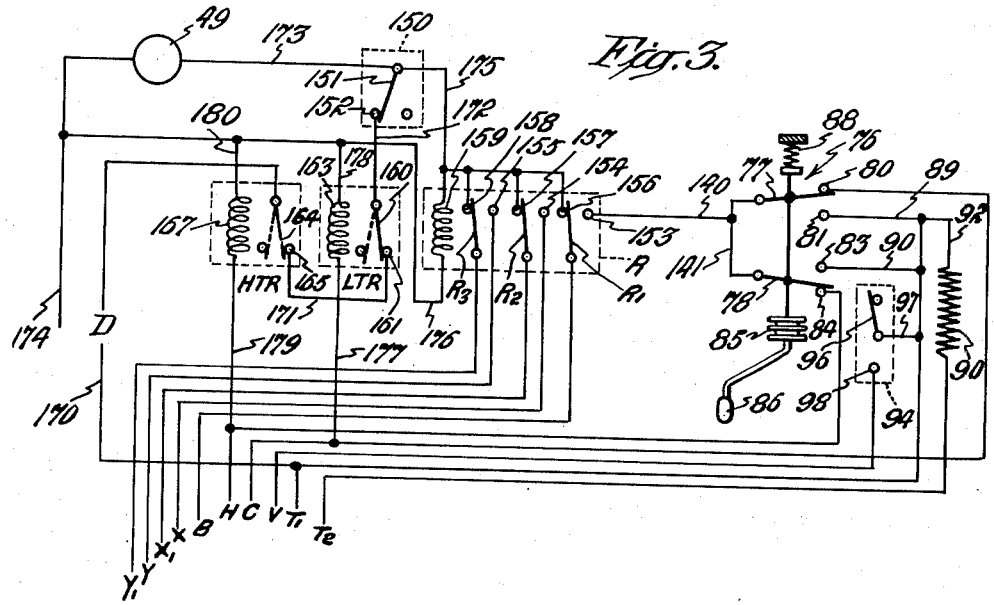
Fig. 3 is a view of the wiring diagram of the heat control and shown with the parts actuated to adjust and initiate operation of the apparatus to dehumidify the air by cooling and reheat the dehumidified air.

The reheat control comprises a humidistat 150 responsive to the humidity in the enclosure 6, the reheat relay R, a low temperature cut-out relay LTR and a high temperature cut-out relay HTR. The humidistat 150 comprises a movable contact 151 and a fixed contact 152. The arrangement is such that below a predetermined humidity the contacts 151 and 152 are open, but upon an increase in humidity above said predetermined value the contacts are closed. The reheat relay R comprises a three-pole double-throw switch having movable contacts $R_1$, $R_2$ and $R_3$ normally biased into engagement with fixed contacts 153, 154 and 155 as illustrated in Fig. 2 but movable into engagement with the fixed contacts 156, 157 and 158 as illustrated in Fig. 3 upon energization of relay coil 159.

The low temperature relay LTR comprises a single-pole switch having a movable contact 160 normally biased into engagement with a fixed contact 161 but movable to open circuit position upon energization of an actuating coil 163. The high temperature relay HTR comprises a single-pole switch having a movable contact 164 normally biased into engagement with a fixed contact 165 but movable open circuit position upon energization of an actuating coil 167.

The dehumidifying circuit D comprises a conductor 170 connecting $T_1$ to the movable contact 164 of the high temperature relay HTR, a conductor 171 connecting fixed contact 165 of relay HTR to fixed contact 161 of low temperature relay LTR and a conductor 172 connecting movable contact 160 of relay LTR to fixed contact 152 of the humidistat 150. When the contacts 151 and 152 of the humidistat 150 are closed, a circuit is completed from contact 151 through a conductor 173 to the magnetic actuating coil of the drain valve 49 and through conductor 174 to return conductors 111 and $T_2$. A branch conductor 175 also connects the movable contact 151 of the humidistat 150 to the fixed contacts 156, 157 and 158 of the relay switches $R_1$, $R_2$ and $R_3$ of the reheat relay R. Branch conductor 175 also is connected to one end of the relay actuating coil 159 and the opposite end of the relay coil is connected by a conductor 176 to conductors 174, 111 and T₂.

One end of actuating coil 163 of the low temperature relay LTR is connected to the cooling circuit C by a conductor 177 and a circuit from the actuating coil is completed through conductors 178, 174 and 111 to T₂. Actuating coil 167 of the high temperature relay HTR is connected to the heating circuit H by a conductor 179. The circuit from the actuating coil 167 is completed through conductors 180, 176, 174 and 111 to T₂. The control circuits having now been described in detail, the mode of operation is explained as follows.

*Mode of operation*

With the parts in the position illustrated in Figs. 1 and 2 of the drawings, the apparatus is adjusted for cooling, the temperature in the enclosure 6 is between the upper and lower temperature limits and the humidity is low so that the apparatus is not operating to either heat, cool or dehumidify the air. Upon an increase in temperature the switch 78 of the differential thermostat 76 will move into engagement with fixed contact 83 to simultaneously energize the cooling and burner circuits C and B and thereby initiate operation of the refrigeration system. The cooling circuit C is energized from T₁ through conductor 90, switch 78, conductor 141, switch 77 and conductor C. With the apparatus already adjusted for a cooling operation the only immediate effect of energizing the cooling circuit C is the opening of the low temperature relay LTR in the dehumidifying circuit D.

Burner circuit B is energized from T₁ through conductor 90, switch 78, conductors 141 and 140, relay switch R₁ of reheat relay R, conductor B, winding of valve motor 57 and conductors 142 and 111 to T₂. Energization of the motor 57 opens the master fuel valve 53 to supply fuel to burner 50 which is ignited by a suitable pilot burner (not shown) to heat the boiler 13. Simultaneously, fuel valve 55 is opened by a circuit from B through conductor 145, electromagnet winding for valve 55, and conductors 146 and 111 to T₂ to supply fuel to the burner 51. Steam from boiler 13 flows through the steam main 40, diverter valve 14, and conduit 41 to chamber 23 of generator 15 to heat the upright tubes 19 and thereby initiate operation of the refrigeration system to supply refrigerant to the evaporator or cooling element 10.

After heat is applied to the boiler 13 there will be a delay before the steam is delivered to the heating chamber 23 of the generator 15. When steam is delivered to the generator 15 the thermal responsive element 129 actuates the delayed action control switch 122 to engage movable contacts 123 and 128 with the fixed contacts 121 and 130, respectively. Closing of switch contacts 121 and 123 completes a circuit from conductor C through a branch circuit comprising conductor X, relay switch R₂ of reheat relay R, conductor X₁, switch contacts 121 and 123, conductor 124, relay coil 125, conductor 126, switch 127 (closed upon opening of master fuel valve 53) and conductors 142 and 111 to T₂. Energization of relay coil 125 closes relay switch 70 to initiate operation of the cooling tower fan 34, cooling tower pump 35 and condensate return pump 31a. Closing of switch contacts 128 and 130 of the delayed action control switch 122 completes a circuit from T₁ through conductor 131, switch contacts 128 and 130, relay coil 100 and conductor 101 to T₂.

Energization of relay coil 100 closes relay switch 67 to initiate operation of the circulating fan 8. Air to be conditioned then is drawn from the enclosure 6 by the fan 8 and the air flows through the duct 5 where it is filtered by the filter 9 and cooled and dehumidified by the cooling element 10. The conditioned air is then delivered through the duct 7 back to the enclosure 6.

Upon a decrease in the temperature in the enclosure 6 the thermostatic switch 78 moves back to the position shown in Fig. 2 to open and de-energize the cooling circuit C and burner circuit B. The thermostat 76 operates in the manner described above to close the cooling and burner circuits C and B upon a predetermined increase in temperature and open the circuits upon a predetermined decrease in temperature so long as cooling is required.

Upon a further decrease in temperature in the enclosure 6 the thermostatic switch 77 will be actuated from the position shown in Fig. 2 into engagement with fixed contact 81 to simultaneously energize the heating circuit H and burner circuit B and thereby adjust and initiate operation of the apparatus for heating. Heating circuit H is completed from T₁ through the conductor 89, switch contacts 81 and 77, conductor 141, switch contacts 78 and 84, conductor H, branch conductor 137, limit switch 138, conductor 108, motor winding 109 and conductors 110 and 111 to T₂. Energization of the motor winding 109 turns the shaft of motor 43 through an arc of 180° and shifts valve element 14a to close conduit 41 and open conduit 42. A circuit is also completed from the conductor H through the electromagnetic actuating coil for the water valve 135 and then through conductors 136 and 111 to T₂. Energization of the latter circuit opens the valve 125 to supply water to the humidifier 12.

Burner circuit B is energized as previously explained to open fuel valve 53 and thereby initiate operation of the boiler 13. Simultaneously, fuel valve 55 will be opened to supply fuel to burner 51. A branch circuit from conductor H is completed through the conductor Y, relay switch R₃ of relay R, conductor Y₁, electromagnetic actuating coil for fuel valve 56 and conductors 139 and 111 to T₂. Energization of the Y circuit will open the fuel valve 56 to burner 52 to increase the rate of heating of the boiler during a heating operation. When steam is supplied to the heating radiator 11 the thermal element 129 will actuate the delayed action control switch 122 to initiate operation of the circulating fan 8 as previously explained but the cooling circuit C is open so that the cooling tower fan 34, cooling tower pump 35 and condensate return pump 31a will not operate. Thus, operation of the heating and cooling systems is automatically controlled in accordance with temperature changes in the enclosure 6 to maintain the air in the enclosure between predetermined upper and lower temperature limits.

When the air in the enclosure is below the upper temperature limit at which the switch 78 of the thermostat 76 moves into engagement with the contact 83 and above the lower temperature limit at which the switch 77 engages the fixed contact 81, the dehumidifying circuit D may be energized by closure of switch contacts 151 and 152 of the humidistat 150. The dehumidifying circuit is completed as illustrated in Fig. 3 from T₁ through conductor 170, contacts 164 and 165 of high temperature relay switch HTR, conductor 171, contacts 160 and 161 of the low temperature relay switch LTR, conductor 172, contacts 152 and 151 of humidistat 150, conductor 173, drain valve 49 and conductors 174 and 111 to T2. Upon opening of the drain valve 49 condensate drains for the liquid trap 47 in the by-pass conduit 46, see Fig. 1, to open the latter for the flow of steam from the boiler 13 to the heating element 11.

Simultaneously, a circuit is completed from the humidistat 150 through conductor 175, relay coil 159 of the relay R and conductors 176, 174 and 111 to T2. Energization of the relay coil 159 shifts the relay switches R1, R2 and R3 from the position shown in Fig. 2 into engagement with the fixed contacts 156, 157 and 158, respectively, as shown in Fig. 3. The burner circuit B is then energized from the humidistat 150 through conductor 175, relay switch R1, conductor B and conductors 142 and 111 to T2 to open the fuel valve 53 and initiate operation of the boiler 13. A branch circuit from the humidistat 150 is also conditioned for energization through the conductor 175, relay switch R2 and conductor X1, delayed action control switch 122, relay coil 125, conductor 126, switch 127 and conductors 142 and 111 to T2 to initiate operation of the cooling tower fan 34, cooling tower pump 35, and condensate return pump 31a. Still another branch circuit is completed from the humidistat 150 through conductor 175, relay switch R3, conductor Y1, fuel valve 56 and conductors 139 and 111 to T2 to open the valve and supply fuel to burner 52. The relay R thus permits energization of the burner circuit, the cooling tower circuit X1 and auxiliary burner circuit Y1 without energizing either the cooling circuit C or heating circuit H.

Steam from the boiler 13 then flows through the main 40 to the diverter valve 14 where part of the steam flows through the conduit 41 to initiate operation of the refrigeration system and part of the steam flows through the by-pass conduit 46 and conduit 42 to the heating radiator 11 to initiate operation of the heating system. Steam supplied to the refrigeration system or heating system will actuate the delayed action control switch 122 to initiate operation of the circulating fan 8 and cooling tower fan 34, cooling tower pump 35 and condensate return pump 31a as previously explained. Air drawn from the enclosure 6 by the fan 8 is filtered by the filter 9, dehumidified by cooling it below its dew point as it flows through the evaporator 10, reheated by the radiator 11 to its original temperature and then returned to the enclosure 6.

The apparatus continues to operate to dehumidify and reheat the air until either the humidity is lowered which opens switch contacts 151 and 152 of the humidistat 150 or the temperature increases or decreases to the upper or lower temperature limit, respectively. Upon opening of the switch contacts 151 and 152 of the humidistat 150 the coil 159 of relay R is deenergized and the relay switches R1, R2 and R3 shift from the position illustrated in Fig. 3 back to their original position illustrated in Fig. 2. Upon an increase in temperature in the enclosure 6 to the upper temperature limit, the switch 78 of thermostat 76 moves into engagement with the fixed contact 83 to energize the cooling circuit C. Energization of the cooling circuit C completes a branch circuit through conductor 177, actuating coil 163 of the low temperature relay LTR and conductors 178, 176, 174 and 111 to T2. Energization of the coil 163 actuates switch contact 160 to the dotted line position illustrated in Fig. 3 to open the dehumidifying circuit D. Drain valve 49 then closes and condensate from the heating radiator 11 flows through the conduit 42 into the liquid trap 47 and quickly closes the by-pass conduit 46 to stop reheat, the apparatus continuing to operate on straight cooling. At the very beginning of the cooling operation when shifting from dehumidification, there may be a short interval while steam flows to the heating radiator 11 but the period of time will be so short as to be unnoticed.

Upon a decrease in temperature in the enclosure 6 to the lower temperature limit, the switch 77 of thermostat 76 will move into engagement with the fixed contact 81 to energize the heating circuit H. Energization of the heating circuit H also energizes the branch circuit through conductor 179, actuating coil 167 for the high temperature relay HTR and conductors 180, 176, 174 and 111 to T2. Energization of the actuating coil 167 moves contact 164 to the position illustrated in dotted lines in Fig. 3 to open the dehumidifying circuit D. Energization of the heating circuit H adjusts and initiates operation of the apparatus for a heating operation as previously explained.

Thus, the control of the present invention automatically adjusts and initiates operation of the apparatus for a cooling operation when the temperature increases to an upper temperature limit; adjusts and initiates operation of the apparatus for heating when the temperature in the enclosure decreases to a low temperature limit; adjusts and initiates operation of the apparatus to dehumidify the air by cooling and reheat the dehumidified air when the temperature is between the upper and lower limits and the humidity is high; and shifts back to straight cooling or heating if the temperature increases or decreases to the upper and lower temperature limits, respectively.

*Modified reheat control*

Figure 4:
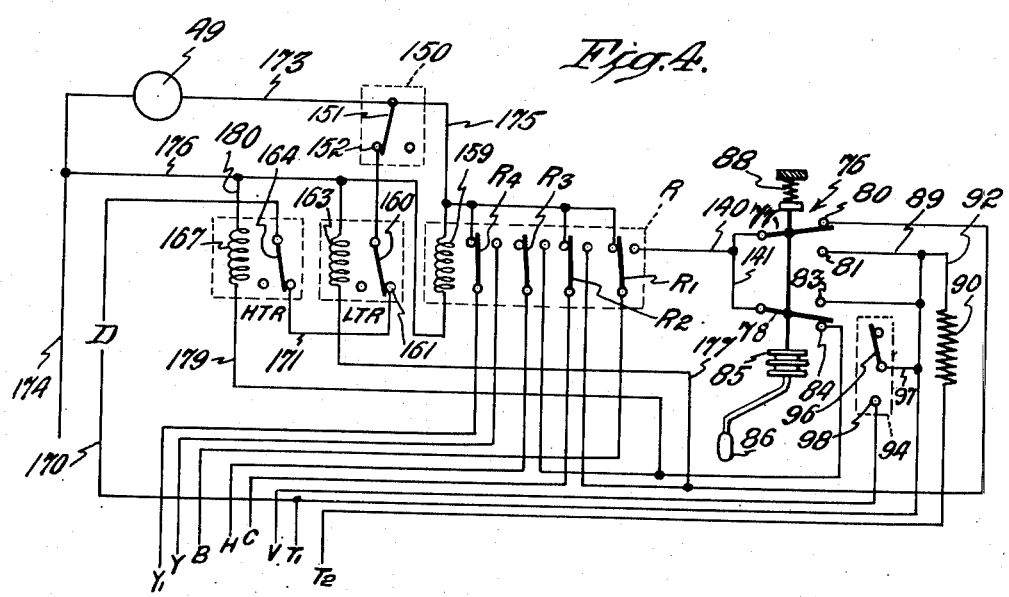
Fig. 4 is a wiring diagram of a modified dehumidification and reheat control arrangement.

Fig. 4 illustrates a modified reheat control arrangement which may be found desirable in certain installations. When reheat is initiated after the unit has been on heating with the control arrangement illustrated in Figs. 1 to 3, all of the steam supplied from the boiler 13 will be delivered to the heating coil 11. The usual reheat results will not be obtained but the temperature in the enclosure 6 will increase until the thermostat 76 is actuated to energize the cooling circuit C and thereby adjust and initiate operation of the apparatus for straight cooling. When the temperature of the enclosure 6 decreases sufficiently to move switch 78 of thermostat 76 to the position illustrated in Fig. 3 then the apparatus will be shifted automatically to dehumidification with reheat. If this reheat operation of the apparatus after a heating cycle is considered undesirable it may be remedied by the arrangement shown in Fig. 4.

The arrangement illustrated in Fig. 4 is identical with that illustrated in Figs. 2 and 3 except for relay R which has four switches, R1, R2, R3 and R4. Relay switch R1 is connected in the burner circuit B and relay R4 is connected in branch circuit Y, Y1, as in Figs. 2 and 3. Relay switch R2, however, is connected in conductor C of the cooling circuit at a point from the thermostat 76 beyond the connection 177 to the actuating coil 163 for the low temperature relay LTR and relay switch R₃ is connected in conductor H of the heating circuit beyond the connection 179 to the actuating coil 167 of the high temperature relay HTR.

Heating and cooling operations are initiated in the same manner as previously described. When the dehumidifying circuit is energized switches R₁, R₂, R₃ and R₄ of the relay R are shifted to the position illustrated in Fig. 4. When the relay R is actuated the burner circuit B is energized by relay switch R₁, cooling circuit C is energized by relay switch R₂ and branch circuit Y₁, is energized by relay switch R₄. If a reheat operation is initiated when the diverter valve 14 is in heating position energization of the cooling circuit C will immediately shift the diverter valve 14a to cooling position. The conductor H is opened by relay switch R₃ beyond the connection 179 so that energization of the heating circuit through the limit switches 107 and 138 of the motor 43 for the diverter valve 14 will not actuate the high temperature relay HTR. Also, the energization of the cooling circuit C beyond the connection 177 will not cause the high temperature relay HTR to open. The branch circuit X, X₁, is eliminated as the energization of the cooling circuit C through the relay switch R₂ will initiate operation of the cooling tower fan 34, cooling tower pump 35 and condensate return pump 31a. Thus, a reheat operation is immediately initiated whether or not the unit has been previously adjusted for heating. If the switch 78 of the thermostat 76 closes with contact 83 upon an increase in temperature to energize the cooling circuit C, the high temperature relay HTR will open the dehumidifying circuit D to stop reheat and relay R will shift back to straight cooling. If the switch 77 of the thermostat 76 closes with contact 81 upon a decrease in temperature the low temperature relay LTR will open the dehumidifying circuit D to stop reheat and relay R will shift back to straight heating.

It will now be observed that the present invention provides a control for automatically adjusting and regulating operation of an air conditioning apparatus to dehumidify the air by cooling and reheat dehumidified air between upper and lower temperature limits. It will still further be observed that the present invention provides a control operable at an upper temperature limit to initiate cooling, operable at a lower temperature limit to initiate heating and operable between the upper and lower temperature limits to initiate dehumidification with reheat when the humidity is high. It will still further be observed that the present invention provides a control for stopping reheat at upper and lower temperature limits to prevent overheating or undercooling.

While two control arrangements are herein illustrated and described, it will be understood that further modifications may be made in the construction and arrangement of parts without departing from the spirit or scope of the invention. The term "humidistat" as used in the specification and claims is intended to include any device responsive to a change in the relative humidity or moisture content of the air. Therefore without limitation in this respect, the invention is defined by the following claims.

I claim:

1. In a heat operated air conditioning apparatus, a source of heat, heat exchange means, control means for adjusting said apparatus for operation by heat from said source to supply either a heating medium or a cooling medium to said heat exchange means, a humidistat in said control means for adjusting said apparatus to supply both a cooling medium and heating medium to said heat exchange means simultaneously to dehumidify the air by cooling it below its dew point and heat the dehumidified air, and a differential thermostat in the control means responsive to a condition affected by the heat exchange means and operable at upper and lower temperature limits to render the humidistat inoperative whereby to prevent overheating or undercooling of the air being conditioned.

2. In a heat operated air conditioning apparatus, a source of heat, heat exchange means, control means for adjusting said apparatus for operation by heat from said source to supply either a heating medium or a cooling medium to said heat exchange means, a differential thermostat in said control means responsive to a condition affected by said heat exchange means and operable at upper and lower temperature limits to initiate operation of the apparatus to supply a cooling or heating medium, respectively, to the heat exchange means, a humidistat in said control means for initiating operation of said apparatus to supply a cooling medium and heating medium to said heat exchange means simultaneously to dehumidify the air by cooling it below its dew point and heat the dehumidified air, and means operated by the thermostat at the upper and lower temperature limits for rendering the humidistat inoperative.

3. In an air conditioning apparatus, a heat operated refrigeration system having a cooling element for cooling and dehumidifying air, a source of heat, control means including a differential thermostat affected by said cooling element and operable at upper and lower temperature limits, said control means being operative at the upper temperature limit of said thermostat to supply heat from said source to operate the refrigeration system, a heating element, a second control means including a humidistat affected by said cooling element for supplying heat from said source to the refrigeration system and heating elements simultaneously to dehumidify the air by cooling and heat the dehumidified air, and means operated by the thermostat at the upper and lower temperature limits for rendering the humidistat inoperative whereby to prevent overheating or undercooling of the air.

4. In an air conditioning apparatus, a heat operated refrigeration system having a cooling element, a heating system having a heating element, a source of heat, electric control means comprising a first circuit having a temperature responsive switch operable at a predetermined temperature for initiating operation of the refrigeration system, a second circuit having a temperature responsive switch operable at a lower predetermined temperature for initiating operation of the heating system, a third circuit having a humidity responsive switch for initiating operation of the refrigeration and heating systems simultaneously, and switching means in the third circuit responsive to the energization of either the first and second circuits for deenergizing the third circuit to prevent overheating or undercooling of the air.

5. In an air conditioning apparatus, a heat operated refrigeration system having a cooling element, a heating system having a heating element, a source of heat, electric control means comprising a cooling circuit for initiating operation of the refrigeration system when energized, a heating circuit for initiating operation of the heating system when energized, a thermostatic controller responsive to a condition affected by the heating and cooling elements and connected to energize the refrigeration circuit at an upper temperature limit, energize the heating circuit at a lower temperature limit, and denergizing both circuits between said limits, a dehumidifying circuit having a controller responsive to a humidity condition affected by said heating and cooling elements for initiating operation of both the refrigeration and heating systems simultaneously to dehumidify the air by cooling and heat the dehumidified air, and means operated by the energization of either the cooling or heating circuits for denergizing the dehumidifying circuit to prevent heating or cooling the air above or below the upper and lower temperature limits.

6. Air conditioning apparatus comprising a heating system having a heating element, a heat operated refrigeration system having a cooling element, a source of heating medium, conduit means including a selective valve for directing heating medium from said source to the heating system or heat operated refrigeration system, respectively, a differential thermostat responsive to a condition affected by said heating and cooling elements and connected to operate the selective valve at upper and lower temperature limits, a conduit for directing heating medium from said source to the heating element independently of the selective valve, valve means for controlling the flow of heating medium through said conduit, a humidistat operable at a predetermined humidity to supply heat from said source to the refrigeration system and open the valve means in said conduit to supply heat to the heating system, and means operated by the thermostat at the upper and lower temperature limits for rendering the humidistat inoperative.

7. Air conditioning apparatus comprising a heating system having a heating element, a heat operated refrigeration system having a cooling element, a source of steam, conduit means including a selective valve for directing steam from said source to the heating system or heat operated refrigeration system, respectively, a differential thermostat responsive to a condition affected by said heating and cooling elements and connected to operate the selective valve at upper and lower temperature limits, a conduit for delivering steam from said source to the heating element independently of said selective valve and arranged to receive condensate from the heating element, said conduit being formed to provide a liquid trap, a drain from the liquid trap, a valve for closing the drain to accumulate condensate in the liquid trap and close the conduit, a humidistat operable at a predetermined humidity to supply heat from said source to the refrigeration system and open the drain valve to draw off condensate and open the conduit, and means operated by the thermostat at the upper and lower temperature limits for rendering said humidistat inoperative.

8. An air conditioning apparatus comprising a heating system having a heating element, a heat operated refrigeration system having a cooling element, a source of steam, conduit means including a selective valve for directing steam from said source to either the refrigeration system or heating system, respectively, a differential thermostat responsive to a condition affected by said heating and cooling elements and connected to actuate the selective valve at upper and lower temperature limits, a by-pass around the selective valve for delivering steam to the heating element and arranged to receive condensate therefrom, said by-pass being formed to provide a liquid trap, a drain from the liquid trap, a valve for closing the drain to accumulate condensate in the liquid trap and close the by-pass, a humidistat connected to operate the selective valve and open the drain valve at a predetermined humidity to supply heat to the refrigeration system and heating system simultaneously, and means operated by the thermostat at the upper and lower temperature limits for rendering the humidistat inoperative to open the drain valve.

9. An air conditioning unit comprising a heat operated refrigeration system having a cooling element, a heating system having a heating element, a source of heat, electric control means comprising a cooling circuit for initiating operation of the refrigeration system when energized, a heating circuit for initiating operation of the heating system when energized, a thermostatic controller responsive to a condition affected by the heating and cooling elements comprising a pair of double-throw switches arranged to be operated sequentially upon a change in temperature, said switches being so connected in the heating and cooling circuits as to initiate operation of the refrigeration system at an upper temperature limit and initiate operation of the heating system at a lower temperature limit, a dehumidifying circuit having a controller responsive to a humidity condition for initiating operation of the refrigeration and heating systems simultaneously to dehumidify the air by cooling and heat the dehumidified air, and means operated by the energization of either the cooling or heating circuits for deenergizing the dehumidifying circuit to prevent overheating or undercooling the air during dehumidification.

10. An air conditioning unit comprising a heat operated refrigeration system having a cooling element, a heating system having a heating element, a source of heat, electric control means comprising a cooling circuit for initiating operation of the refrigeration system when energized, a heating circuit for initiating operation of the heating system when energized, a controller comprising a pair of double-throw switches, a thermostatic element responsive to a condition affected by the heating and cooling elements and connected to operate the movable switches sequentially upon a change in temperature, said switches being so connected in the heating and cooling circuits as to initiate operation of the refrigeration system at an upper temperature limit and initiate operation of the heating system at a lower temperature limit, a dehumidifying circuit having a controller responsive to a humidity condition for initiating operation of the refrigeration and heating systems simultaneously to dehumidify the air by cooling and heat the dehumidified air, a pair of relay switches connected in series in said dehumidifying circuit, said relay switches having electromagnetic coils connected in the refrigeration and heating circuits, respectively, whereby energization of either the heating circuit or refrigeration circuit will deenergize the dehumidifying circuit to prevent overheating or undercooling the air.

11. In an air conditioning unit, a heat operated refrigeration system having a cooling element, a heating system having a heating element, a source of heating medium, a control valve for controlling the supply of heating medium from said source, conduits including selective valve means for directing heat from said source to the refrigeration system or heating system or to both the refrigeration and heating systems simultaneously, electric control means comprising a circuit to actuate the control valve, a cooling circuit for actuating the selective valve means to supply heating medium to the refrigeration system, a heating circuit for actuating the selective valve means to supply heating medium to the heating system, a dehumidifying circuit for actuating the selective valve means to supply heating medium to both the refrigeration and heating systems simultaneously, a differential thermostat affected by the heating and cooling elements and connected to energize the control valve actuating circuit and either the refrigeration or heating circuit at upper and lower temperature limits, respectively, a humidistat for energizing the control valve actuating circuit and dehumidifying circuit, and relay switches in the dehumidifying circuit and connected to be actuated by energization of either the refrigeration or heating circuits for deenergizing the dehumidifying circuit.

12. An air conditioning apparatus comprising means for supplying a heating medium and a cooling medium, heat exchange means, temperature control means responsive to a condition affected by the heat exchange means and operable at upper and lower temperature limits for adjusting the apparatus to supply cooling medium or heating medium, respectively, to the heat exchange means, humidity control means responsive to a condition affected by the heat exchange means for adjusting said apparatus to supply cooling medium and heating medium to said heat exchange means simultaneously to dehumidify the air by cooling and heat the dehumidified air, and means operated by the temperature control means at the upper and lower temperature limits for rendering the humidity control means inoperative to control the apparatus whereby to prevent overheating or undercooling of the air.

13. An air conditioning unit comprising a refrigeration system, a heating system, electric control means including a cooling circuit for initiating operation of the refrigeration system when energized, a heating circuit for initiating operation of the heating system when energized, temperature responsive means oeprable at upper and lower temperature limits for energizing the cooling circuit or heating circuit, respectively, a dehumidifying circuit having a controller responsive to a humidity condition for initiating operation of the refrigeration system and heating system simultaneously to dehumidify the air by cooling and heat the dehumidified air, a pair of switches connected in series in said dehumidifying circuit, and said switches having actuating means connected in the heating and cooling circuits, respectively, whereby energization of either the heating circuit or cooling circuit will deenergize the dehumidifying circuit to prevent overheating or undercooling of the air.

14. In a heat operated air conditioner, a source of heat, heat exchange means, valve means for adjusting said apparatus for operation by heat from said source to supply either a heating medium or a cooling medium to the heat exchange means, control means including a humidistat for adjusting said valve means to simultaneously supply both a cooling medium and a heating medium to the heat exchange means to dehumidify the air by cooling and reheat the dehumidified air, and a supervisory thermostat in said control means operable at upper and lower temperature limits to adjust the valve means to supply only a cooling medium or heating medium, respectively, to the heat exchange means to prevent overheating or undercooling of the air.

HARRY C. SHAGALOFF.

REFERENCES CITED

The following references are of record in the file of this patent:

UNITED STATES PATENTS

| Number | Name | Date |
| --- | --- | --- |
| 2,112,038 | McLenegan | Mar. 22, 1938 |
| 2,381,427 | Andersson | Aug. 7, 1945 |
| 2,469,142 | Andersson | May 3, 1949 |
| 2,486,908 | Andersson | Nov. 1, 1949 |